United States Patent Office 3,280,016
Patented Oct. 18, 1966

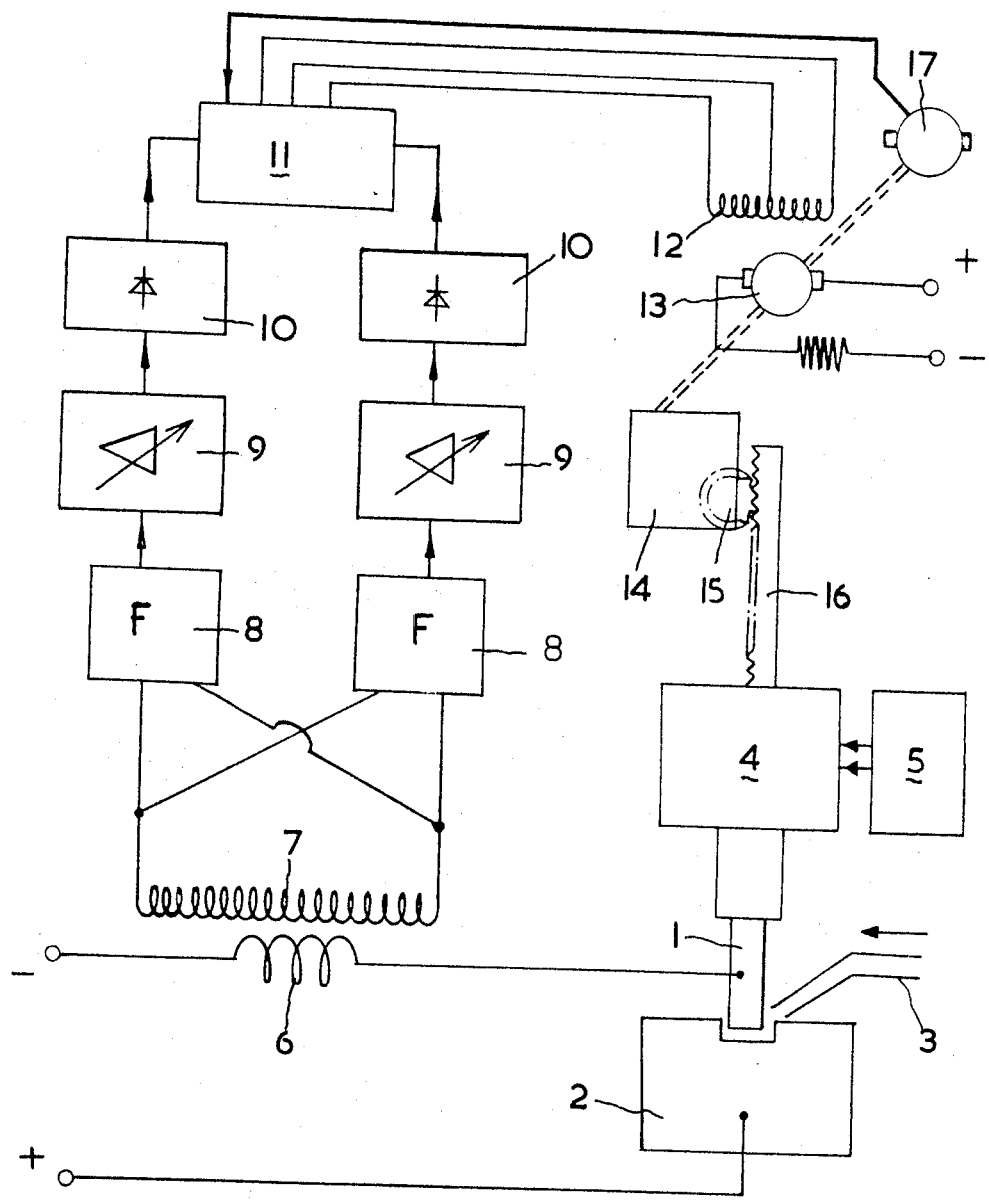

3,280,016
ELECTROCHEMICAL MACHINING OF METALS
Ludvik Bass and Robert Stanley Bennett, Solihull, England, assignors to Birmingham Small Arms Company Limited, Birmingham, England, a British company
Filed Dec. 27, 1962, Ser. No. 247,582
Claims priority, application Great Britain, Dec. 29, 1961, 46,618/61
9 Claims. (Cl. 204—143)

This invention relates to the electro-chemical machining of metals, that is to say, the removal of metal from a workpiece by passing an electric current between the workpiece and a suitably shaped tool electrode across a gap containing an electrolyte.

It can be shown that, under certain limited conditions, where the apparatus is supplied with clean electrolyte at a constant temperature and the rate of feed of the tool electrode towards the work (or of the work towards the electrode) is appropriately selected, the size of the gap between the electrode and the workpiece is self-adjusting and remains substantially constant, giving a cutting rate equal to the rate of feed of the tool electrode. In such ideal circumstances it is not necessary to have a control system; the rate of feed of the tool electrode is merely preset to a value slightly lower than the theoretical maximum cutting rate, an anodic efficiency of between eighty and ninety percent being usually assumed.

Where such ideal conditions cannot be attained but where the conditions are still relatively simple, the effective surface area of the tool electrode remaining constant, and the size of the working gap being uniform all over the effective surface, then it is possible to control the size of the gap simply by controlling the rate of feed or the voltage across the gap in accordance with the magnitude of the electric current in such a manner as to keep that current constant. This type of control does usually keep the gap reasonably constant and where the control is achieved by varying the rate of feed (the voltage being kept constant) it maintains a uniform power consumption and therefore helps to stabilise the temperature and conductivity of the electrolyte. Furthermore it protects the direct current supply system against overloading, and, as the magnitude of the current is proportional to the gap, the system can readily be used to give a reading of the size of the gap.

However, where the effective area of the tool electrode increases, for example in die sinking or in the shaping of turbine blades, a constant current control system is no longer adequate and it is then advisable or even essential to adopt other means. It is an aim of the present invention to provide a relatively simple method of automatically setting, controlling and measuring continuously the gap between the tool electrode and the workpiece for a wide variation in the shapes and sizes of the electrode and the workpiece, even where the gap is not uniform over the area of the electrode.

According to the invention, in a process for the electro-chemical machining of metals by passing a direct current across a gap filled with an electrolyte between a tool electrode and a workpiece, the gap is varied by oscillating either the tool electrode or the workpiece, the known amplitude of oscillation being in the feed direction and being small in comparison with the gap, and the resultant ripple produced on the direct electrical current flowing across the gap is compared with the value of that direct current (or with the value of a signal known to be proportional to that direct current) to give an indication of the mean size of the gap. Preferably, according to a further feature of the invention, this comparison is used to produce a signal controlling a servo-motor which operates in such a manner as to keep the mean size of the gap constant.

Preferably, it is the tool electrode that is oscillated. For example, it may be oscillated by an ultrasonic vibrator. However, it should be emphasised that for the purposes of the present invention the frequency need not be ultrasonic but could be as low as only a few cycles per second. However, the accuracy and speed of response are better at the higher frequencies. It is not essential for the whole of either the tool electrode or the workpiece to be oscillated bodily at all, provided its effective surface is oscillated in a manner such as to vary the gap. For example in a machine for cutting off or slitting, the tool electrode could be a rotating disc, in which case the variation could be achieved by making the periphery of the disc of wavy or toothed outline.

According to a further feature of the invention the direct current supply is obtained by rectification of an alternating current and the signal used as a basis for indicating the total mean current is the magnitude of the ripple present from the alternating current source, this ripple being at a multiple of the alternating current frequency.

By way of explanation of the invention it may be mentioned that, even where the gap between the tool electrode and the workpiece is non-uniform, the current passing through any small elemental area of the surface of the electrode or workpiece is proportional to the local voltage gradient, and this voltage gradient is approximately equal to the applied voltage divided by the size of the gap at that particular point under consideration. When the size of the gap is changed by displacing the tool electrode or the workpiece, this changes the voltage gradient and therefore the current. Provided the displacement occurs at a faster rate than any change in the shape of the surface of the workpiece or in the electrical conductivity of the electrolyte in the gap, then the relative change in current produced by the displacement is equal to the relative change in the size of the gap, assuming the displacement is small in comparison with the total size of the gap.

As the ratio of the change in current to the total mean current is equal to the ratio of the change in the size of the gap to the mean size of the gap it will be seen that, by varying the gap by a known amount and comparing the resultant change in current with the mean current, we have a continuous indication of the mean size of the gap. By moving the electrode or the workpiece in a manner that keeps this current ratio constant, we thereby keep the mean value of the gap constant, independently of the rate of machining, or of local variations in the shape of the workpiece or of the gap, and also independently of variations in the conductivity of the electrolyte.

It can be shown that the control system described, in which the mean gap is kept constant, enables one to carry out the machining process at the maximum possible rate for a wide variety of shapes of tool electrode, including those in which in the gap is non-uniform. This is because the mean size of the gap that is kept constant is not the arithmetic mean but is weighted in favour of regions where the machining is rapid, the weighting being dependent on the power density dissipated in the gap.

The invention will now be further described by way of example with reference to the accompanying drawing, which shows diagrammatically the circuit of an arrangement for carrying out the method according to the invention.

In the drawing a tool electrode 1 is shown machining a recess in a workpiece 2. The gap between them is occupied by a continuously and rapidly circulating electrolyte fed through a pipe 3. The necessary direct electrical current, flowing in a direction such that the workpiece is the anode and the tool electrode is the cathode, is obtained by rectification of a three-phase alternating current supply.

The tool electrode 1 is vibrated in a direction towards and away from the work by an ultrasonic transducer 4 deriving its power from a generator 5. The amplitude of these vibrations is known and is small in comparison with the size of the gap between the tool electrode and the workpiece. A typical frequency for the vibrations might be 20,000 cycles per second but, as explained earlier, the frequency could if desired be much lower than ultrasonic frequencies for the purpose of the present invention.

The vibrations of the tool electrode 1 generate a ripple in the direct current flowing across the gap, the amplitude of the ripple being proportional to the amplitude of the vibrations. At the same time there is a further ripple present in the direct current supply as a result of rectifying the alternating current from which it is derived. Where the alternating current supply is three-phase and has a frequency of fifty cycles per second, and is then full-wave rectified, the ripple current has a frequency of three hundred cycles per second. As the magnitude of the direct current varies, the amplitude of this ripple remains proportional to it.

In one of the leads carrying the direct current there is the primary winding 6 of an air-cored current transformer, consisting of a few turns. The many-turn secondary winding 7 of this transformer has induced in it signals proportional to both ripple frequencies. These are separated by two filters 8, one tuned to 300 cycles per second and the other to 20,000 cycles per second. From the filters the alternating current ripple signals are fed through respective variable-gain amplifiers 9 and are then rectified at 10 to produce two direct current signals, one proportional to the high frequency ripple (and hence proportional to the amplitude of vibration of the tool electrode), and the other proportional to the three hundred cycle ripple (and hence to the mean value of the direct current).

The two direct current signals are fed to a power amplifier 11 which energises the two halves of the split field winding 12 of a direct current servo motor 13. This motor is connected through a reduction gearbox 14 to a pinion 15 engaging a rack 16 connected to the tool electrode 1. A tachometer generator 17 also driven by the motor 13 produces a signal proportional to velocity, which is fed back into the power amplifier 11 to ensure stability of the servo system.

It will be understood that motor 13 drives the tool electrode 1 towards the workpiece 2 at a rate which maintains the ratio between the two ripple currents substantially constant. This means that the ratio between the amplitude of the vibrations and the size of the gap is constant, and since the amplitude of vibration is constant this means that the mean size of the gap is kept constant. It will be noted that this constancy is independent of variations in the conductivity of the electrolyte or of local variations in the gap at particular points of the workpiece.

The apparatus is set up initially by adjusting the gains of the two amplifiers 9, and their relative values set the size of the gap. The outputs of these two amplifiers contain indicating meters (not shown). The ratio of the reading of the two meters gives a measure of the size of the gap.

Although, as indicated earlier, the frequency of vibrations of the tool electrode could be as low as only a few cycles a second, an ultrasonic frequency is preferred, not only because vibrations at such frequencies help to prevent the formation of resistive films at the surfaces of the electrodes but also because, although we have assumed the resistance of the gap is linear, i.e. current density is uniformly proportional to voltage gradient, this is not strictly true, because some of the voltage drop across the gap is contributed by the electrochemical overpotentials at the surface of the electrode and workpiece. However it takes an appreciable time before a change of current causes a corresponding change in the overpotential, usually about a millisecond. If the frequency of vibration is faster than this the overpotentials remain substantially constant and the *effective* resistance of the gap remains linear.

Whilst we have illustrated an arrangement in which the tool electrode is vibrated bodily it would be possible, though less practical, to vibrate the workpiece. As indicated earlier, the required effect could be obtained without vibrating either of them bodily, if instead the effective surface is vibrated, for example by making the tool electrode in the form of a rotating disc with an undulating or toothed periphery. As the tool electrode rotates its peripheral surface approaches and recedes from the surface of the workpiece in a cyclic manner to produce the required ripple.

We claim:

1. A process for controlling the electrochemical machining of metals comprising passing a direct electric current across a gap filled with an electrolyte between a tool electrode and a workpiece electrode, advancing one of said electrodes towards the other at a controlled rate, oscillating one of said electrodes with a known amplitude of oscillation in the direction across said gap thereby varying the magnitude of said gap and thereby causing the production of a first electrical signal in the form of an alternating signal superimposed on said direct current, deriving a second electrical signal, said second electrical signal being proportional to the magnitude of said direct current, comparing said first and second signals to derive a third electrical signal, and utilising said third signal to control the rate of mutual advance of said electrodes in such a manner as to keep the ratio of said first and second signals, and hence the magnitude of said gap, substantially constant.

2. The process set forth in claim 1, wherein said direct current is obtained by rectification of an alternating current supply and wherein said second signal is the residual ripple component left in said direct current as a consequence of rectification.

3. The process set forth in claim 2, wherein said first and second signals are both derived from a conductor carrying the current that passes across said gap, and are separated by filtering.

4. The process set forth in claim 3, wherein the electrode that is oscillated is the tool electrode and the oscillation is performed electro-mechanically.

5. Apparatus for the electro-chemical machining of metals comprising a tool electrode, means for supporting a workpiece in spaced relationship from said tool electrode to define a gap therebetween, means for oscillating said tool electrode in the direction in which said gap extends, the amplitude of oscillations imparted being small in comparison with the mean size of said gap, means for passing a continuous flow of electrolyte through said gap, a first lead adapted for connection between said workpiece and the positive side of a source of direct electric current, a second lead adapted for connection between said tool electrole and the negative side of the source of direct electric current, means responsive to the magnitude of the direct electric current flowing in said leads, means responsive to the magnitude of the alternating current ripple superimposed on said direct current by the oscillation of said tool electrode, and means for producing a signal in response to changes in the ratio of magnitude of the direct electric current to the magnitude of the alternating current ripple and control means responsive to said produced signal for driving said tool electrode in a direction towards said gap at a rate such as to keep said ratio substantially constant.

6. Apparatus as set forth in claim 5, including indicating means giving readings indicative of the values of said magnitudes.

7. Apparatus as set forth in claim 5 including rectifier means having an alternating electric current input and a direct electric current output, said leads being connected across said output, and wherein said means responsive to the magnitude of the direct electric current comprise detector means for an alternating current ripple superimposed on the direct current in said leads by said rectifier.

8. Apparatus for the electro-chemical machining of metals comprising a tool electrode, a workpiece electrode in spaced relationship from said tool electrode to define a gap therebetween, means for oscillating said tool electrode in the direction in which said gap extends, the amplitude of the oscillations imparted being small in comparison with the mean size of the gap, means for passing a continuous flow of electrolyte through the gap, a rectifier having an input adapted for connection to an alternating current supply and having positive and negative output terminals, a first lead between said positive terminal and said workpiece electrode, a second lead between said negative terminal and said tool electrode, detector means in one of said leads responsive respectively to the magnitude of the ripple current induced in said leads by said oscillating means and of the ripple current induced in said leads from said rectifier, and means for producing a signal in response to changes in the ratio of magnitude of the direct electric current to the magnitude of the alternating current ripple and control means responsive to said produced signal for driving said tool electrode in a direction towards said gap at a rate such as to keep said ratio substantially constant.

9. Apparatus according to claim 8 wherein said ripple-responsive means comprise a transformer feeding two filters tuned respectively to the frequencies of said first and two ripple currents.

References Cited by the Examiner

UNITED STATES PATENTS

| | | | |
|---|---|---|---|
| 2,826,540 | 3/1958 | Keeleric | 204—143 |
| 3,035,149 | 5/1962 | Matulaitis | 219—69 |
| 3,072,777 | 1/1963 | McKechnie | 219—69 |
| 3,134,011 | 5/1964 | DeBruyn | 219—69 |
| 3,175,145 | 3/1965 | Brouwer | 318—293 |

FOREIGN PATENTS

| | | |
|---|---|---|
| 748,485 | 5/1956 | Great Britain. |
| 789,293 | 1/1958 | Great Britain. |
| 145,104 | 5/1962 | Russia. |

JOHN H. MACK, *Primary Examiner.*

HOWARD S. WILLIAMS, R. K. MIHALEK,
*Assistant Examiners.*